(12) United States Patent
He et al.

(10) Patent No.: US 11,397,716 B2
(45) Date of Patent: Jul. 26, 2022

(54) METHOD AND SYSTEM FOR AUTOMATICALLY TAGGING DATA

(71) Applicant: Microsoft Technology Licensing, LLC, Redmond, WA (US)

(72) Inventors: Yeye He, Bellevue, WA (US); Jie Song, Ann Arbor, MI (US); Yue Wang, Bellevue, WA (US); Surajit Chaudhuri, Kirkland, WA (US); Vishal Kumar Seshagirirao Anil, Redmond, WA (US); Yaron Y. Goland, Seattle, WA (US); Gaurav Malhotra, Bothell, WA (US); Blake Lassiter, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/953,313

(22) Filed: Nov. 19, 2020

(65) Prior Publication Data
US 2022/0156242 A1 May 19, 2022

(51) Int. Cl.
*G06F 16/22* (2019.01)
*G06F 16/23* (2019.01)

(52) U.S. Cl.
CPC ........ *G06F 16/2272* (2019.01); *G06F 16/221* (2019.01); *G06F 16/2365* (2019.01)

(58) Field of Classification Search
CPC . G06F 16/2272; G06F 16/221; G06F 16/2365
See application file for complete search history.

(56) References Cited

U.S. PATENT DOCUMENTS

2002/0159641 A1\* 10/2002 Whitney .............. G06K 9/6228
382/219
2008/0082393 A1\* 4/2008 Ozzie ................. G06Q 30/0282
705/7.11

(Continued)

FOREIGN PATENT DOCUMENTS

CN       111008265 A       4/2020

OTHER PUBLICATIONS

"Alation", Retrieved from: https://web.archive.org/web/20201105041238/https://www.alation.com/, Nov. 5, 2020, 8 Pages.

(Continued)

*Primary Examiner* — Jensen Hu

(57) ABSTRACT

Systems and methods relate to auto-tagging of data in a data lake or a data storage. Generating a statistical summary of the data lake and interactively receiving data in a selected column of an exemplar data addresses an issue of efficiently and accurately auto-tagging data in a data lake. The present disclosure automatically generates a statistical summary of the data lake using a lightweight off-line processing. A graphical user interface interactively receives an exemplar data file with a selection of a column in the exemplar data file. A list of candidate data-tagging patterns is generated based on the statistical summary and updates the list by removing candidate data-tagging patterns that under-generalize the data. The present disclosure determines a data-tagging pattern by selecting a candidate data-tagging profile from the list based on having the least number of matching columns in the data lake.

20 Claims, 11 Drawing Sheets

(56) References Cited

U.S. PATENT DOCUMENTS

| | | | |
|---|---|---|---|
| 2008/0091549 A1* | 4/2008 | Chang | G06Q 30/0269 705/14.66 |
| 2008/0103849 A1* | 5/2008 | Forman | G06K 9/6262 705/7.37 |
| 2008/0154820 A1* | 6/2008 | Kirshenbaum | G06K 9/6227 706/20 |
| 2010/0100577 A1 | 4/2010 | Middleton et al. | |
| 2015/0134650 A1 | 5/2015 | Gkoulalas-divanis et al. | |
| 2017/0124176 A1* | 5/2017 | Beznos | G06Q 20/102 |
| 2018/0074786 A1 | 3/2018 | Oberbreckling et al. | |
| 2018/0113894 A1 | 4/2018 | Raza et al. | |
| 2020/0174966 A1* | 6/2020 | Szczepanik | G06F 16/116 |
| 2021/0098133 A1 | 4/2021 | Chowdhry et al. | |

OTHER PUBLICATIONS

"Ataccama: Data Profiling", Retrieved from: https://web.archive.org/web/20200809223432/https://www.ataccama.com/product/data-discovery-and-profiling, Aug. 9, 2020, 9 Pages.

"Data Catalog", Retrieved from: https://web.archive.org/web/20200919012017/https://azure.microsoft.com/en-us/services/data-catalog/, Sep. 19, 2020, 11 Pages.

"Data Profiling: A Secret Weapon in Your Fight Against Bad Data", Retrieved from: https://web.archive.org/web/20190510080641/https://www.trifacta.com/data-profiling/, May 10, 2019, 10 Pages.

"Google Cloud Data Catalog", Retrieved from: https://cloud.google.com/data-catalog, Retrieved Date: Oct. 10, 2020, 13 Pages.

"Lumada Data Catalog", Retrieved from: https://www.hitachivantara.com/en-us/products/data-management-analytics/lumada-data-catalog.html?source=waterline, Retrieved Date: Oct. 10, 2020, 4 Pages.

"Microsoft.ProgramSynthesis.Extraction.Tex", Retrieved from: https://www.nuget.org/packages/Microsoft.ProgramSynthesis.Extraction.Text/, Retrieved Date: Oct. 10, 2020, 3 Pages.

"What Is AWS Glue?", Retrieved from: https://web.archive.org/web/20201105075617/https://docs.aws.amazon.com/glue/latest/dg/what-is-glue.html, Nov. 5, 2020, 2 Pages.

"XSystem-Old", Retrieved from: https://bitbucket.org/andrewiilyas/xsystem-old/src/outlier-detection/, Retrieved Date: Oct. 10, 2020, 3 Pages.

Bollacker, et al., "Freebase: A Collaboratively Created Graph Database for Structuring Human Knowledge", In Proceedings of the ACM SIGMOD International Conference on Management of Data, Jun. 9, 2008, pp. 1247-1249.

Chaiken, et al., "SCOPE: Easy and Efficient Parallel Processing of Massive Data Sets", In Proceedings of the VLDB Endowment vol. 1, Issue 2, Aug. 23, 2008, pp. 1265-1276.

Cortez, et al., "Annotating Database Schemas to Help Enterprise Search", In Proceedings of VLDB Endowment, vol. 8, Issue 12, Aug. 2015, pp. 1936-1939.

Do, et al., "Comparison of Schema Matching Evaluations", In Net. ObjectDays: International Conference on Object-Oriented and Internet- Based Technologies, Concepts, and Applications for a Networked World, Sep. 2002, pp. 221-237.

Dong, et al., "Knowledge Vault: A Web-scale Approach to Probabilistic Knowledge Fusion", In Proceedings of the 20th ACM SIGKDD international conference on Knowledge discovery and data mining, Aug. 24, 2014, pp. 601-610.

Fisher, et al., "From Dirt to Shovels: Fully Automatic Tool Generation from Ad Hoc Data", In Proceedings of the 35th Annual ACM SIGPLAN-SIGACT Symposium on Principles of Programming Languages, vol. 43, Issue 1, January 7, 2008, pp. 421-434.

Fisher, et al., "PADS: A Domain-Specific Language for Processing Ad Hoc Data", In Proceedings of the ACM SIGPLAN Conference on Programming Language Design and Implementation, Jun. 12, 2005, pp. 295-304.

Gao, et al., "Building a Large-scale, Accurate and Fresh Knowledge Graph", In Proceedings of ACM SIGKDD International Conference on Knowledge Discovery and Data Mining, Aug. 19, 2018, 156 Pages.

Groningen, et al., "elasticsearch", Retrieved from: https://github.com/elastic/elasticsearch/blob/master/libs/grok/src/main/resources/patterns/grok-patterns, Retrieved Date: Oct. 10, 2020, 3 Pages.

Guyer, et al., "Data Profiling Task", Retrieved from:https://docs.microsoft.com/en-us/sql/integration-services/control-flow/data-profiling-task?view=sql-server-ver15, Mar. 14, 2017, 8 Pages.

Halevy, et al., "Managing Google's data lake: an overview of the goods system", In Proceedings of IEEE Data Eng. Bull, vol. 39, Issue 3, 2016, pp. 5-14.

He, et al., "SEISA: Set Expansion by Iterative Similarity Aggregation", In Proceedings of the 20th International Conference on World wide web, Mar. 28, 2011, pp. 427-436.

Hoffart, et al., "YAGO2: A spatially and temporally enhanced knowledge base from Wikipedia", In Journal Artificial Intelligence, vol. 194, Jan. 2013, pp. 28-61.

Hulsebos, et al., "Sherlock: A Deep Learning Approach to Semantic Data Type Detection", In Proceedings of the 25th ACM SIGKDD International Conference on Knowledge Discovery & Data Mining, Aug. 4, 2019, pp. 1500-1508.

Ilyas, et al., "Extracting Syntactical Patterns from Databases", In Proceedings of IEEE 34th International Conference an Data Engineering, Apr. 16, 2018, 13 Pages.

Li, et al., "Discovering Enterprise Concepts using Spreadsheet Tables", In Proceedings of the 23rd ACM SIGKDD International Conference on Knowledge Discovery and Data Mining, Aug. 13, 2017, pp. 1873-1882.

Ota, et al., "Data-driven Domain Discovery for Structured Datasets", In Proceedings of the VLDB Endowment, vol. 13, Issue 7, Mar. 1, 2020, pp. 953-965.

Padhi, et al., "FlashProfile: A Framework for Synthesizing Data Profiles", In Proceedings of the ACM on Programming Languages, No. 2, Oct. 24, 2018, 28 Pages.

Padhi, et al., "Flashprofile: Interactive Synthesis of Syntactic Profiles", In Journal of Computing Research Repository, 2017, 15 Pages.

Pantel, et al., "Web-Scale Distributional Similarity and Entity Set Expansion", In Proceedings of the 2009 Conference an Empirical Methods in Natural Language Processing, Aug. 2009, pp. 938-947.

Raman, et al., "Potter's Wheel: An Interactive Data Cleaning System", In Proceedings of the 27th International Conference on Very Large Data Bases, Sep. 11, 2001, 10 Pages.

Sen, et al., "Bootstrapping Privacy Compliance in Big Data Systems", In Proceedings of IEEE Symposium on Security and Privacy, May 18, 2014, pp. 327-342.

Venetis, et al., "Recovering Semantics of Tables on the Web", In Proceedings of the VLDB Endowment, vol. 4, Issue 9, Aug. 29, 2011, pp. 528-538.

Wang, et al., "Language-Independent Set Expansion of Named Entities using the Web", In Seventh IEEE International Conference on Data Mining, Oct. 28, 2007, pp. 342-350.

Wang, et al., "Understanding Tables on the Web", In Proceedings of the 31st International Conference on Conceptual Modeling, Oct. 15, 2012, 14 Pages.

Yan, et al., "Synthesizing Type-Detection Logic for Rich Semantic Data Types using Open-source Code", In Proceedings of the International Conference on Management of Data, Jun. 10, 2018, pp. 35-50.

Zhang, et al., "Sato: Contextual SemanticType Detection in Tables", In Publication of arXiv:1911.06311v1, Nov. 14, 2019, 14 Pages.

Zhao, et al., "Auto-em: End-to-end Fuzzy Entity-matching using Pre-trained Deep Models and Transfer Learning", In Proceedings of The World Wide Web Conference, May 13, 2019, pp. 2413-2424.

Zhou, et al., "SCOPE: parallel databases meet MapReduce", In the International Journal on Very Large Data Bases, vol. 21, Issue 5, Oct. 2012, pp. 611-636.

"Bing Entity Search API", Retrieved from: https://www.microsoft.com/en-us/bing/apis/bing-entity-search-api, Retrieved Date: Oct. 10, 2020, 5 Pages.

"Build and Organize your Flow", Retrieved from: https://web.archive.Org/web/20200806081003/https://help.tableau.com/current/prep/en-us/prep_build_flow.htm, Aug. 6, 2020, 24 Pages.

"DataSpiders", Retrieved from: https://github.com/alex-bogatu/DataSpiders, Retrieved Date: Oct. 10, 2020, 2 Pages.

(56) References Cited

OTHER PUBLICATIONS

"Informatica Data Quality", Retrieved from: https://www.informatica.com/content/dam/informatica-com/en/collateral/data-sheet/en_informatica data-quality_data-sheet_6710.pdf, Retrieved Date: Oct. 10, 2020, 4 Pages.

"TensorFlow Data Validation: Checking and Analyzing Your Data", Retrieved from: https://web.archive.org/web/20201103102316/https://www.tensorflow.org/tfx/guide/tfdv, Nov. 3, 2020, 14 Pages.

"Transform, shape, and model data in Power BI-documentation", Retrieved from: https://web.archive.org/web/20200813101111/https://docs.microsoft.com/en-us/power-bi/transform-model/, Aug. 13, 2020, 2 Pages.

"Writing Custom Classifiers", Retrieved from: https://web.archive.org/web/20201024020945/https://docs.aws amazon.com/glue/latest/dg/custom-classifier.html, Oct. 24, 2020, 13 Pages.

"XGBoost Documentation", Retrieved from: https://web.archive.org/web/20191123134115/https://xgboost.readthedocs.io/en/latest/index.html, Nov. 2019, 3 Pages.

"Non Final Office Action Issued in U.S. Appl. No. 17/104,145", dated Oct. 15, 2021, 13 Pages.

Agresti, et al., "A Survey of Exact Inference for Contingency Tables", In Journal of Statistical science, vol. 7, Issue 1, Jan. 1992, pp. 131-177.

Berti-Equille, et al., "Discovery of Genuine Functional Dependencies from Relational Data with Missing Values", In Proceedings of the VLDB Endowment, vol. 11, Issue 8, Apr. 2018, pp. 880-892.

Bogatu, et al., "Dataset Discovery in Data Lakes", In Proceedings of IEEE 36th International Conference on Data Engineering, Apr. 20, 2020, pp. 709-720.

Breck, et al., "Data Validation for Machine Learning", In Proceedings of the 2nd Machine Learning and Systems, Apr. 15, 2019, 14 Pages.

Carrillo, et al., "The Multiple Sequence Alignment Problem in Biology", In SIAM journal on applied mathematics, vol. 48, Issue 5, Oct. 1998, pp. 1073-1082.

Yan, et al., "Coded: col. Oriented Data Error Detection with Statistical Constraints", Retrieved From: https://www.cs.sfu.ca/~jnwang/papers/TR-CODED.pdf, Retrieved on: Oct. 10, 2020, 16 Pages.

Chiang, et al., "Discovering Data Quality Rules", In Proceedings of the VLDB Endowment, vol. 1, Issue 1, Aug. 23, 2008, pp. 1166-1177.

Chu, et al., "Discovering Denial Constraints", In Proceedings of the VLDB Endowment, vol. 6, Issue 13, Aug. 26, 2013, pp. 1498-1509.

Cormen, et al., "Introduction To Algorithms", In Publication of MIT Press, Jul. 31, 2009, 1313 pages.

Dasu, et al., "Mining Database Structure; or, How to Build a Data Quality Browser", In Proceedings of ACM SIGMOD International Conference on Management of Data, Jun. 4, 2002, pp. 240-251.

Dayal, et al., "Data Integration Flows for Business Intelligence", In Proceedings of the 12th International Conference on Extending Database Technology: Advances in Database Technology, Mar. 24, 2009, pp. 1-11.

Golab, et al., "Data auditor: Exploring Data Quality and Semantics using Pattern Tableaux", In Proceedings of VLDB Endowment, vol. 3, Issue 2, Sep. 1, 2010, pp. 1641-1644.

Huang, et al., "Auto-detect: Data-driven Error Detection in Tables", In Proceedings of the International Conference on Management of Data, Jun. 10, 2018, pp. 1377-1392.

Hynes,, et al., "The Data Linter: Lightweight, Automated Sanity Checking for ml data sets", In NIPS MLSys Workshop, Dec. 4, 2017, pp. 1-7.

Ilyas, et al., "Cords: Automatic Discovery of Correlations and Soft Functional Dependencies", In Proceedings of the ACM SIGMOD International conference on Management of data, Jun. 13, 2004, 12 Pages.

Just, Winfried, "Computational Complexity of Multiple Sequence Alignment with sp-score", In Journal of computational biology, vol. 08, Issue 6, Nov. 1, 2001, pp. 1-16.

Kanji, Gopalk., "100 Statistical Tests", In Publication of Sage, Jul. 18, 2006, 257 Pages.

Karp, et al., "A fast parallel algorithm for the maximal independent set problem", In Journal of the ACM (JACM), vol. 32, Issue 4, Oct. 1, 1985, pp. 762-773.

Kivinen, et al., "Approximate Inference of Functional Dependencies From Relations", In Journal of Theoretical Computer Science, vol. 149, Issue 1, Sep. 18, 1995, pp. 129-149.

Lu, "What are Azure Machine Learning pipelines?", Retrieved from: https://docs.microsoft.com/en-us/azure/machine-learning/concept-ml-pipelines, Aug. 17, 2020, 8 Pages.

Mahdavi, et al., "Raha: A configuration-free error detection system", In Proceedings of the International Conference an Management of Data, Jun. 30, 2019, pp. 865-882.

Naumann, Felix, "Data Profiling Revisited", In Journal of ACM SIGMOD Record, vol. 42, Issue 4, Dec. 2013, pp. 40-49.

Patel, et al., "Big Data Processing at Microsoft: Hyper scale, Massive Complexity, and Minimal Cost", In Proceedings of the ACM Symposium on Cloud Computing, Nov. 20, 2019, 1 Page.

Polyzotis, et al., "Data Management challenges in Production Machine Learning", In Proceedings of the ACM International Conference on Management of Data, May 14, 2017, pp. 1723-1726.

Qahtan, et al., "Anmat: automatic knowledge discovery and error detection through pattern functional dependencies", In Proceedings of the International Conference on Management of Data, Jun. 30, 2019, pp. 1977-1980.

Rahm, et al., "A survey of approaches to automatic schema matching", In VLDB Journal—The International Journal on Very Large Data Bases, vol. 10, Issue 4, Dec. 2001, pp. 334-350.

Rahm, et al., "Data Cleaning: Problems and Current Approaches", In Journal of IEEE Data Engineering Bulletin, vol. 23, Issue 4, Dec. 2000, pp. 3-13.

Schelter, et al., "Automating Large-Scale Data Quality Verification", In Proceedings of the Very Large Data Bases Endowment, Aug. 2018, pp. 1781-1794.

Schelter, et al., "Differential data quality verification on partitioned data", In Proceedings of IEEE 35th International Conference on Data Engineering, Apr. 8, 2019, 6 Pages.

Schelter, et al., "Unit testing data with deequ", In Proceedings of the International Conference on Management of Data, Jun. 30, 2019, pp. 1993-1996.

Schmidt, et al., "Deequ—Unit Tests for Data", Retrieved from: https://web.archive.org/web/20201105084802/https://github.com/awslabs/deequ, Nov. 5, 2020, 6 Pages.

Stonebraker, et al., "Data Integration: The Current Status and the Way Forward", In Journal of IEEE Data Engineering Bulletin, vol. 41, Issue 2, Jun. 2018, pp. 3-9.

Swami, et al., "Data Sentinel: A Declarative Production-Scale Data Validation Platform", In Proceedings of IEEE 36th International Conference on Data Engineering, Apr. 20, 2020, pp. 1579-1590.

Vassiliadis, et al., "Near Real Time etl", In Journal of New trends in data warehousing and data analysis, Jan. 2009, pp. 1-38.

Wang, et al., "Uni-Detect: A Unified Approach to Automated Error Detection in Tables", In Proceedings of the International Conference on Management of Data, Jun. 30, 2019, pp. 811-828.

"International Search Report and Written Opinion Issued in PCT Application No. PCT/US21/052748", dated Jan. 5, 2022, 11 Pages.

"International Search Report and Written Opinion Issued in PCT Application No. PCT/US21/058500", dated Feb. 2, 2022, 11 Pages.

* cited by examiner

Data Lake A

| Row# | Column 1 "Recorded Time" | Column 2 | Column 3 "Parts Name" | ... | Column 41480 |
|---|---|---|---|---|---|
| 0001 | 7/10/2018 9:07:25 AM | 08/25/2000 012:34:45ok | 012/3/4567 Random99 | | 99aeA3jw0-iqwksnahr |
| 0002 | 7/11/2018 9:07:43 PM | ... | 012/3/5567 ABC***xx3 | | SPkjfoAiNvettsliyoqp |
| 0004 | 8/12/2019 9:07:56 PM | | 012/3/6567 Random99 | | ... |
| 0005 | 8/12/2019 9:08:01 AM | | 012/3/4567 Random22 | | |
| 0006 | 9/18/2019 9:08:23 PM | | 012/4/4567 Random33 | | |
| 0007 | 9/12/2019 9:07:45 AM | | 012/3/4567 Random51 | | |
| 0009 | 2/06/2020 9:07:12 PM | | ... | | |
| 0010 | 5/12/2020 9:07:01 AM | | | | |
| 0011 | 9/12/2020 9:07:55 AM | | | | |
| 0012 | 9/12/2020 9:09:05 PM | | | | |
| 0013 | 9/12/2020 9:09:46 AM | | | | |
| 0014 | 1/12/2021 9:10:00 AM | | | | |
| 0015 | 9/12/2021 9:10:05 AM | | | | |
| 0016 | 9/12/2021 9:07:23 PM | | | | |
| 0017 | 9/12/2021 9:07:45 PM | | | | |
| ... | | | | | |
| 9789 | 1/12/2024 11:10:00 AM | | | | |

FIG. 2

Statistical Summary of Data Lake A

| ID | Data-tagging Pattern | # Matching Columns | Exemplar Value |
|---|---|---|---|
| 001 | 09/12/2019<digit>+:<digit>{2}:<digit>{2} <alpha>{2} | 8 | 9/12/2019 9:07:45 AM |
| 002 | <digit>+/<digit>+/<digit>{4} <digit>+:<digit>{2}:<digit>{2} AM | 100 | 9/12/2019 9:07:45 AM |
| 003 | <digit>+/<digit>+/<digit>{4} <digit>+:<digit>{2}:<digit>{2} <alpha>{2} | 250 | 9/12/2019 9:07:45 AM |
| ... | | | |
| 005 | <digit>+/<digit>+/<digit>{4} <digit>+:<digit>{2}+:<digit>{2} <alpha>{2} | 523 | 9/12/2019 9:07:45 AM |
| ... | | | |
| 008 | <alphanum>+/<alphanum>+/<alphanum>+.* | 6,234 | |
| 009 | | | |
| 010 | 08/25/2000 <digit>+:<digit>{2}:<digit>{2}<alpha>{2} | 6 | 08/25/2000 012:34:45ok |
| 011 | <digit>+/<digit>+/<digit>{4} <alphanum>{8} | 6,398 | 012/3/4567 Random99 |
| 012 | 012/3/4567 R+<alphanum>{7} | 5 | 012/3/4567 Random99 |
| 013 | <digit>{2}<alphanum>{6}<digit>-<alphanum>{9} | 168 | 99aeA3jw0-iqwksnahr |
| ... | | | |
| 080 | <digit>+ | 30,093 | 03803403543840 |
| 081 | <alpha>+ | 48,980 | SPkjfoAiNvettsliyoqp |
| 100 | .* | 84,978 | 9/12/2019 9:07:45 AM |

Specify a Column as an Example

Specified Exemplar Data File: Example-Data.csv

Detected FOUR columns in the file.
Select a column in the uploaded file as example data used for auto-tagging data in Data Lake A:

☐ Column Name: Parts ID  (Sample Data Pattern: XXX-XXX-XX)

☐ Column Name: Start Time  (Sample Data Pattern: DD-MM-YYYY HH:MM:SS AM/PM)

☒ Column Name: Manufacturer ID  (Sample Data Pattern: ABC-123-XX)

☐ Column Name: ZIP Code  (Sample Data Pattern: 12345-6789)

( Select )

FIG. 5A

METHOD AND SYSTEM FOR AUTOMATICALLY TAGGING DATA

BACKGROUND

Data storage is an ever-evolving issue as computer use increases daily. Issues with enterprise storage is particularly significant as more and more data is stored in large data groups, e.g., data lakes and/or data estates. Not only is the amount of data being stored increasing, but the issues with maintaining and/or using such vast amounts of data presents their own problems. For instance, maintaining and using data in enterprise data storage are typically subject to various corporate obligations, data governance (e.g., the General Data Protection Regulation compliance) and efficient data discovery. Accordingly, tagging or classifying of data assets, files and databases in data lakes, has become important for enterprises to be able to identify and process data with efficiency and accuracy.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by auto-tagging data types in one or more data lakes in a data estate.

While previous methods of tagging data exist with respect to standard data types, the present disclosure relates auto-tagging data of custom data types in a data lake or other large data storages. The disclosed technology addresses the issue by a combination of automatically generating a statistical summary of a data lake, interactively receiving an exemplar set of data for determining a data-tagging pattern, and then automatically tagging data in the data lake according to a chosen pattern. A combination of the automatic generation of the statistical summary and determination of the data-tagging pattern based on the exemplar set of data with minimal interactions with a user improves efficiency of the auto-tagging of data in the data lake.

The disclosed technology provides the data-tagging pattern for automatically tagging the vast amount of data in the data lake with accuracy. The statistical summary of the data lake includes an extensive set of candidate data-tagging patterns for the data lake. The process of determining the data-tagging pattern based on the exemplar set of data and the extensive set of candidate data-tagging patterns removes data patterns that are either under-generalizing or over-generalizing the data tag. As a result, the disclosed technology determines the data-tagging pattern that is optimized for accurately generalizing data.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 2 illustrates an example of data in a data lake in accordance with aspects of the present disclosure.

FIG. 3 illustrates an example of a statistical summary of a data lake in accordance with aspects of the present disclosure.

FIG. 5A illustrates an example of a screen in accordance with aspects of the present disclosure.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Large enterprise data lakes are increasingly common today, often with petabytes of data and millions of data assets (e.g., flat files or databases). Data estates are even larger, often including one or more data lakes. Each data lake may store data or data assets of the enterprise in a variety of data structures, in a form of columns and rows, for example. Efforts to catalog data assets, including tagging data assets with additional metadata, have become essential for enterprises. Tagging of data has become a prerequisite for downstream applications for managing data governance and data discovery. However, issues arise in efficiently tagging data in data lakes, either due to the amount of data and/or the fact that the data is customized data, e.g., not standard data types.

As discussed in more detail below, the present disclosure relates to auto-tagging significant amounts of data, and, in particular, data of custom data types both efficiently and accurately. The disclosed technology addresses the problem by a combination of automatically generating a statistical summary of a data lake, interactively receiving an exemplar set of data for determining a data-tagging pattern, and auto-tagging data in the data lake. The automatic generation of the statistical summary and determining the data-tagging pattern based on the exemplar set of data with minimal interactions with a user improves efficiency of the auto-tagging of data in the data lake.

Figure 1:
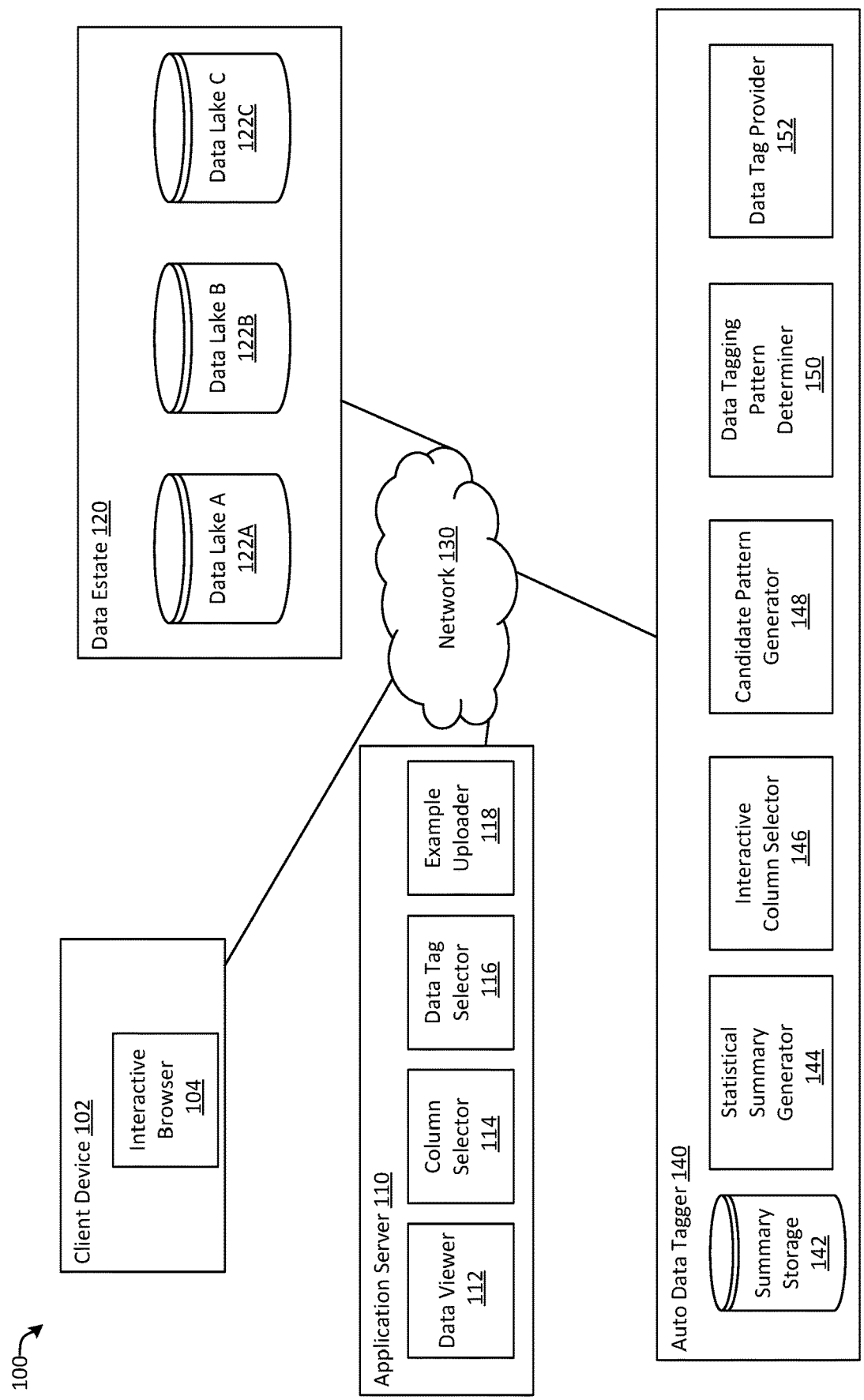
FIG. 1 illustrates an overview of an example system for auto-tagging data in a data lake in accordance to aspects of the present disclosure.

FIG. 1 illustrates an overview of an example system 100 for auto-tagging data in a data lake in accordance with aspects of the present disclosure. System 100 represents a system for auto-tagging data types based on a minimal user interaction and attaining accuracy in data-tagging in terms of a suitable generalization. System 100 includes a client device 102, an application server 110, a network 130, and an auto data tagger 140 for tagging data in a data estate 120. The client device 102 communicates with the application server 110, which includes one or more sets of instructions to execute as applications for the client device 102. The application server 110 includes a data viewer 112, a column selector 114, a data tag selector 116, and an example uploader 118. The one or more sets of instructions in the application server 110 may provide interactive user interface through the interactive browser 104. The data estate 120 includes one or more data lakes, a data lake A 122A, a data lake B 122B, and a data lake C 122C, for example. Each data lake includes data of various data types and formats. The network 130 provides network connectivity the client device 102, the application server 110, the data estate 120, and the auto data tagger 140. The auto data tagger 140 includes a summary storage 142, a statistical summary generator 144, an interactive column selector 146, a candidate pattern generator 148, a data-tagging pattern determiner 150, and a data tag provider 152.

The client device 102 connects with the application server 110 via the network 130 to execute applications that include user interactions through the interactive browser 104. The application server 110 interacts with the client device 102 and the auto data tagger 140 via the network 130 to perform the auto-tagging operations. The auto data tagger 140 connects via the network 130 with the client device 102 through the connection with the application server 110 and the data estate 120 for generating statistical summaries of data lakes and for auto-tagging data in the data lakes.

The client device 102 is a general computer device providing user-input capabilities e.g., the interactive browser 104 for user input in aiding the process of pattern selection. The interactive browser 104 may render graphical user interface by processing as a web browser, for example. In aspects, the client device 102 may communicate over the network 130 with the application server 110.

The application server 110 is a server that includes applications with instructions for the operator to interactively use the system 100 on the client device 102. The applications may include the data viewer 112, the column selector 114, the data tag selector 116, and the example uploader 118. The data viewer 112 provides rendering of data in data lakes for viewing by the user. The column selector 114 may receive an interactive selection of a column in an example data file. The data tag selector 116 may provide an interactive selector for a data-tagging pattern through the interactive browser 104 on the client device 102. The example uploader 118 may upload an example data as specified by the operator for viewing and for selecting an example column for auto-tagging data in data estate 120.

The data estate 120 may include one or more data lakes. Each data lake may store data. Data in respective data lakes may be in a variety of format, a format based on columns and rows for example. Other types of the format may include but not limited to a directed or undirected trees with nodes and edges, for example. Respective data lakes may accommodate one or more data connectors for applications and tools to access the data in the respective data lakes based on one or more types of data format. In aspects, a data lake may be in a size of tens of hundreds of thousands of rows and tens of thousands of columns, for example. The present disclosure provides automatic tagging of data stored in the respective data lakes in the data estate 120.

While shown as the data estate 120 having the data lake A 122A, the data lake B 122B, and the data lake C 122C, those skilled in the art will appreciate that data storage may take various forms, e.g., a cloud storage, a distributed data storage, a centralized data storage, a data farm, data swamp, etc. The data storage may further be volatile or non-volatile.

The auto data tagger 140 represents the applications/systems used for automatically tagging data in one or more data lakes stored in the data estate 120. In embodiments, the auto data tagger 140 includes the statistical summary generator 144 that generates a statistical summary of data and data-tagging patterns in the data lake A 122A, the data lake B 122B, and the data lake C 122C in the data estate 120.

In embodiments the auto data tagger 140 automatically tags data by first generating a statistical summary with data-tagging patterns for tagging data in a data lake using the statistical summary generator 144. Statistical summary generator 144, in some embodiments, partially scans the data lake, receiving an input exemplar column of data from a user, and determines potential data-tagging patterns that may be suitable for auto-tagging data in the data lake. Unlike machine-learning-based approaches, the present disclosure has the advantage of requiring only a minimally labeled example of data, thus providing low labor costs and cost-effectiveness for determining a data-tagging pattern for automatic data-tagging. Unlike content-based or dictionary-based approaches, the present disclosure does not require a full scan of the data lake. The present disclosure generates regex patterns for data-tagging patterns from a partial data of the data lake in the statistical summary.

In aspects, the statistical summary generator may preprocess some of the data, e.g., before receiving an exemplar column data from the user. The statistical summary may be in a form of an index structure including a list of data-tagging patterns in the regex format and statistical information about respective data-tagging patterns. The list of data-tagging patterns in the statistical summary may include patterns that vary in degree of generalization. Some data-tagging patterns may be narrower than others. A pattern with a "wildcard '*'" may be the broadest, covering all data in all columns including a non-null character, for example. The statistical information may include a number of columns that respective data-tagging patterns find matching data in the data lake.

The statistical summary generator 144 generates a statistical summary during an "offline" processing. The "offline" processing may represent a pre-processing before interactively determining a data-tagging pattern by receiving an exemplar column data for auto-tagging. In aspects, the "offline" processing may take place before the operator provides an exemplar column of an example data file. The statistical summary of a data lake may include a plurality of data-tagging patterns for tagging data and statistics data for respective candidate data-tagging patterns. The statistical summary data may further include a number of columns in the data lakes where a candidate data-tagging pattern is applicable for tagging data in a column. There may be more than one potential data-tagging patterns that match with data in a row of the data lake. The statistical summary generator 144 may store a statistical summary of a data lake in the summary storage 142. In aspects, the statistical summary may include an exhaustive list of data-tagging patterns for respective columns of the data lake.

The interactive column selector 146 interactively receives a selection of a column of an example data for use as a reference data column. The auto data tagger 140 may use data in the selected column for determining a data-tagging pattern for auto-tagging data in a data lake. In aspects, the interactive column selector 146 performs the receiving of the selected columns in conjunction with the column selector 114 in the application server and the interactive browser 104 in the client device 102.

The candidate pattern generator 148 generates a list of candidate data-tagging patterns from the data-tagging patterns stored in the statistical summary data. The candidate pattern generator 148 may select data-tagging patterns that match at least one row of data in the selected column of the example data as candidate data-tagging patterns. In some aspects, the list of candidate data-tagging patterns may include data-tagging patterns that are too narrowly (or under-)generalizing the data in the selected column of the example data. Additionally or alternatively, the list of candidate data-tagging patterns may include data-tagging patterns that are too broadly (or over-)generalizing the data in the selected column of the example data. If the data-tagging pattern under-generalizes the data, then too much data may be missed and not tagged leading to inaccurate results. However, if the data-tagging pattern over-generalizes the data then too many data patterns are captured and will be tagged, which is less efficient.

Data-tagging pattern determiner 150 determines a data-tagging pattern from the list for auto-tagging by filtering out candidate data-tagging patterns that are under-generalizing and then selecting a data-tagging pattern that is the least over-generalizing. In aspects, the data-tagging pattern satisfies the following two conditions: (1) Not "under-generalize": or use overly restrictive patterns, which lead to low recall for data-tagging; and (2) Not "over-generalize": or use overly generic patterns (e.g. the trivial ".*"), which lead to low precision. In aspects, technologies used for pattern-profiling for summarizing a given set of values in a column explicitly consider only values in a specific column, without a need to consider values that are not present in the column. A scope of data processing for a pattern profile may limit itself to a specific column because pattern-profiling has its purpose of summarizing data values in the column. For efficient and accurate data-tagging, the focus on a column may be unsuitable. The technologies for data-profiling may under-generalize and miss tagging of columns with a wider variation of data values. Unlike the technologies used for pattern-profiling focusing on data in the specific column, the present disclosure describes the entire domain of possible values for a data type.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

FIG. 2 illustrates an example of data in a data lake in accordance with aspects of the present disclosure. Data 200 may represent data at least in part of data lake A 122 of FIG. 1. Data 200 is in a data format of rows and columns, for example. Data 200 includes 9789 rows and 41480 columns. In aspects, "Data Lake A" is a name of a data lake. Additionally or alternatively, the name of a data lake may be a name of a data table that includes rows and columns of data. FIG. 2 illustrates a column header indicating column numbers may also include column names. (e.g., Column 1 "Parts Name," etc.) Only a part of data is shown in FIG. 2 for an illustrating purpose. In row 0001, column 1 includes data "7/10/2018/9:07:25 AM," column 2 includes "08/25/2000 012:34:45ok", column 3 includes data "012/3/4567 Random99," and column 41480 includes a value "99aeA3jw0-iqwksnahr," for example. Data 200 is an example and does not convey limiting a volume of data in data lake A. In aspects, data in the data lake may be "clean" without an error in data format among data in a column because of a validation check that may take place before storing data in the data lake. In aspects, a data lake may include millions of bits of data. FIG. 2 depicts just some of exemplar values in select columns. In a data lake, data in different columns may be in distinct data formats or patterns. Column 1 is a timestamp data, for example. The timestamp data may include data, time, and an identifier of AM or PM. In aspects the timestamp data may be standardized but in other embodiments, it may be customized. Column 2 includes a row 1 with a value "8/25/2000 012:34:45ok," which represents a custom data format particularly in the part "012:34:45ok," for example. Using the disclosed technology, data in the data lake may be automatically tagged based on a data-tagging pattern that is accurate with a minimal user intervention in specifying a column of exemplar data.

FIG. 3 illustrates an example of a statistical summary according to the aspects of the present disclosure. Data 300 may represent a statistical summary of data lake A. In aspects, the statistical summary may include identifiers and data-tagging patterns that correspond to respective identifiers. The statistical summary may include statistical information about how each of the data-tagging patterns relate to columns in the data lake A. A number of matching columns indicate a number of columns that a data-tagging pattern is applicable. An exemplar value may indicate an exemplar value that matches a corresponding data-tagging pattern.

In a more specific example, data-tagging pattern with ID=001 shows a data-tagging pattern of: "09/12/2019 (space)<digit>+:<digit>{2}:<digit>{2}: <digit>{2}<alpha>{2}" which matches with eight (8) columns in data lake A, for example, as shown in FIG. 3. An exemplar value that matches the data-tagging pattern of ID 001 is "9/12/2019 9:07:45 AM" Also shown in FIG. 3. The example of FIG. 3, shows 100 distinct data-tagging patterns as indicated by the ID numbers. In aspects, there may be more than one data-tagging pattern that match with a particular column in the data lake. For instance, as shown in FIG. 3, at least ID numbers "001," "002," "003," "005," "008" and "100" provide data-tagging patterns that potentially match with Column 1 (FIG. 2) showing a data value. In some aspects, the statistical summary generator 144 may determine a data-tagging pattern to match a column when a number of data in the column that match the data-tagging pattern is greater than zero or alternatively a predetermined threshold. While not shown in FIG. 3, the statistical summary may include data-tagging signatures. Data-tagging signatures illustrates statistical information and identifies that relate to data-tagging of respective columns in the data lake. The data-tagging signatures include a number of matching columns by a data-tagging pattern and other metadata including column-headers, column numbers, column names, and table-names, for example.

In aspects, the statistical summary generator 144 may generate and periodically update the statistical summary data for maintaining the latest statistical summary of the data lake. The statistical summary generator 144 may select a subset of the data lake for generating the statistical summary data. Selection of the subset of the data lake may be based on a random selection or based on a predetermined number of rows of the data lake.

Figure 4:
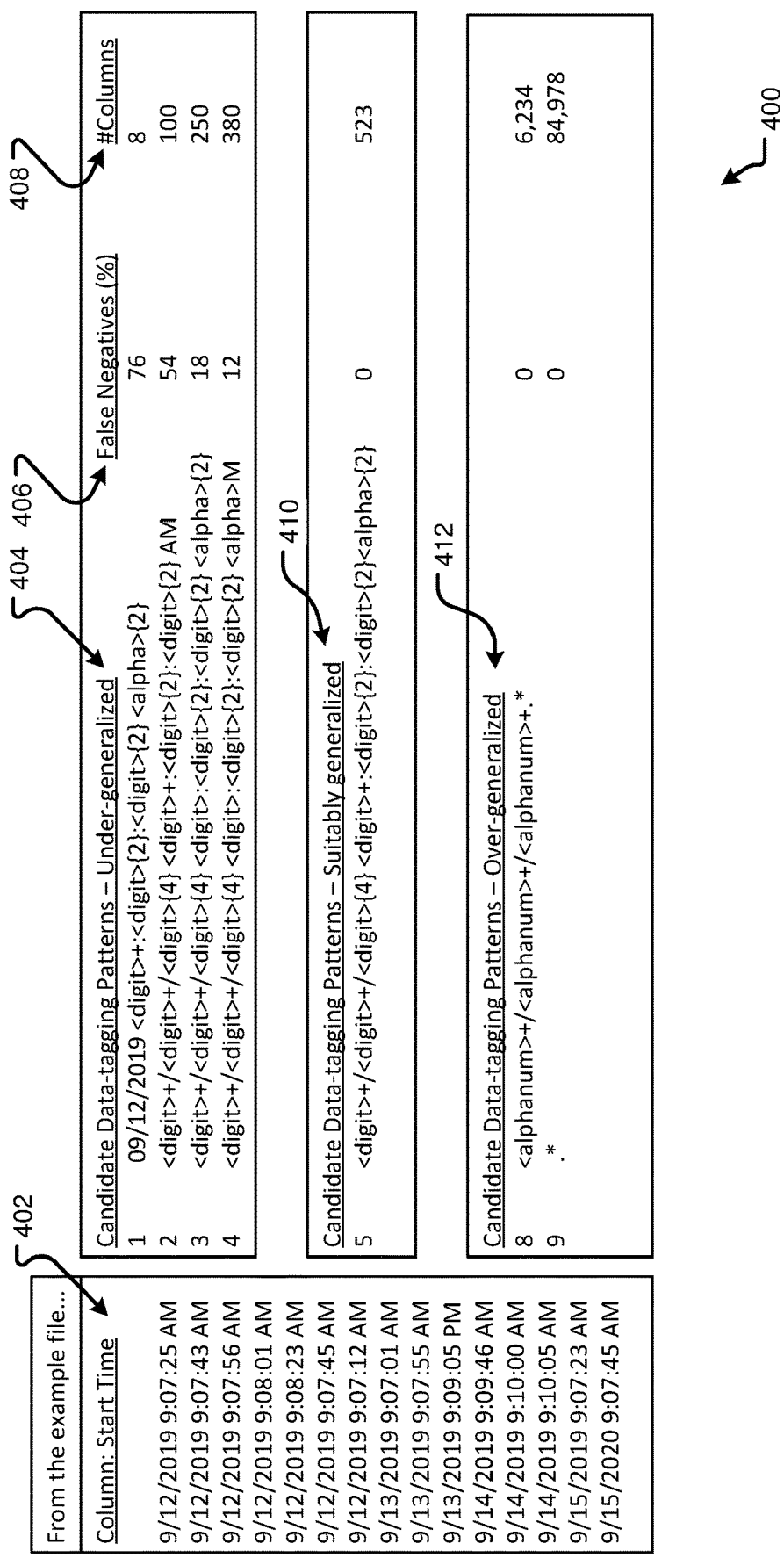
FIG. 4 illustrates an example of a column in an example file and data-tagging patterns in accordance with aspects of the present disclosure.

FIG. 4 illustrates an example of screen in accordance with aspects of the present disclosure. Below the "From the example file . . . " describes an exemplar set of data in a column from an example file that a use has interactively specified. The selected column name is "Start Time." Data in the column include "9/12/2019 09:07:25 AM," "9/12/2019 09:07:43 AM," etc. In aspects, all data in the selected column have a format that is consistent, without inadvertent errors, misspelling, for example. The candidate data-tagging patterns are shown in three separate sections: "under-generalized," "suitably generalized," and "over-generalized." In some aspects, the candidate pattern generator 148 generates a list of data-tagging patterns that match at least one data in the selected column from data-tagging patterns in the statistical summary data for a data lake. In the current example shown in FIG. 4, the candidate pattern generator 148 generated the list of nine data-tagging patterns as numerated from one to nine. In some other aspects, the candidate pattern generator 148 may identify more than nine or less than nine data-tagging patterns. A number of candidate data-tagging patterns may depend on data in the selected column of the exemplar file and data-tagging patterns in the statistical summary for the data lake.

FIG. 4 illustrates an example of a column in an example file and data-tagging patterns in accordance with aspects of the present disclosure. Data 400 represents a set of data originates from an exemplar file and a statistical data summary. Column: Start Time 402 illustrates data in the column with a column name "Start Time." For describing the present technology, this example uses a time stamp data format, including date and time. Candidate data-tagging patterns—under-generalizing 404 lists a set of candidate data-tagging patterns (e.g., four candidate data-tagging patterns) that are categorized or determined as under-generalizing data in the exemplar file. In an embodiment, the four candidate data-tagging patterns indicate values of false negative 406 that is greater than zero, for example. Candidate data-tagging patterns—suitably generalized 410 indicates a data-tagging pattern that is determined as the most suitable (i.e. not under-generalizing and the least over-generalizing). The data-tagging pattern (i.e., #5) indicates a false negative value of zero. The data-tagging pattern has the least number of columns with potential data hits, e.g. in this example that value is "523" as compared with the over-generalized patterns. Candidate data-tagging patterns—over-generalized 412 indicates a list of candidate data-tagging patterns that are determined as over-generalizing data based on the statistical summary of data lake A. Both of the candidate data-tagging patterns that are over-generalizing have the false negative value of zero, while respective values for the number of columns is greater than 523.

In aspects, data-tagging pattern determiner 150 removes under-generalized data-tagging patterns based on false negative rates of matching respective data-tagging patterns with data in the selected column. A false negative rate indicates a rate where a data-tagging pattern fails to match valid data in the selected column of the example file. A data-tagging pattern #1 "09/12/2019<digit>+:<digit>{2}: <digit>{2}<alpha>{2}" fails to match data "9/13/2019 9:07:01 AM" in the selected column, for example. The data-tagging pattern #1 requires the first eleven characters of the data to be "09/12/2019." The column includes a start time that is on 9/13/2019. A data-tagging pattern #2 fails to match some of valid data in the selected column of the example file. The data-tagging pattern #2 fails to match data "9/13/2019 9:09:05 PM," for example. The a data-tagging pattern determiner 150 generates the list of candidate data-tagging patterns based on a number of the false negatives. Data-tagging patterns having false negative rates that is greater than zero may be considered as an under-generalized data-tagging pattern. In Data 400, the candidate data-tagging patterns with identifiers one through four are under-generalized because the four data-tagging patterns have false negative rates of 76%, 54%, 18%, and 12%, for example.

Candidate data-tagging patterns with identifiers 8 and 9 are over-generalized. In aspects, a data-tagging pattern determiner 150 removes over-generalized data-tagging patterns based on a number of applicable columns in the data lake. The candidate data-tagging pattern #8 indicates "<alphanum>+/<alphanum>+/<alphanum>+.*" that is a combination of three instances of alphanumeric data connected by a character '/' and then followed by any character of any length. While the candidate data-tagging pattern matches all the data in the selected column, the candidate data-tagging pattern is so broad or over-generalizing that the pattern matches 6,234 columns in the data lake A. The candidate data-tagging pattern #9 is broader than #8. The pattern #9 is a wildcard of any length, matching 84,978 columns in data lake A. The data-tagging pattern determiner 150 may keep a data-tagging profile with the least number of matching columns. Accordingly, the data-tagging pattern #5 may be the most suitably generalized data-tagging pattern with zero false negative rate and the least number of matching columns in the data lake A.

FIG. 5A illustrates an example of an interactive screen in accordance with aspects of the present disclosure. A graphical user interface 500A (GUI) prompts a user to specify a column of data as an example for determining a data-tagging pattern to be used for auto-tagging. In aspects, the graphical user interface 500A may be displayed on an interactive browser 104 in the client device 102 after the user specifies an exemplar file containing sample data. FIG. 5A provides a name of the specified exemplar file: "Example-Data.csv." The graphical user interface 500 may indicate, for example, that the column selector 114 detected four columns in the exemplar data file. The graphical user interface 500A may list the four columns with respective names and sample data patterns. A user may select one of the columns listed. As an example in FIG. 5, a column with a name "Manufacturer ID" is selected as indicted by the 'X' mark. The sample data pattern may be shown as "ABC-123-XX" as a sample data-tagging pattern.

Figure 5B:
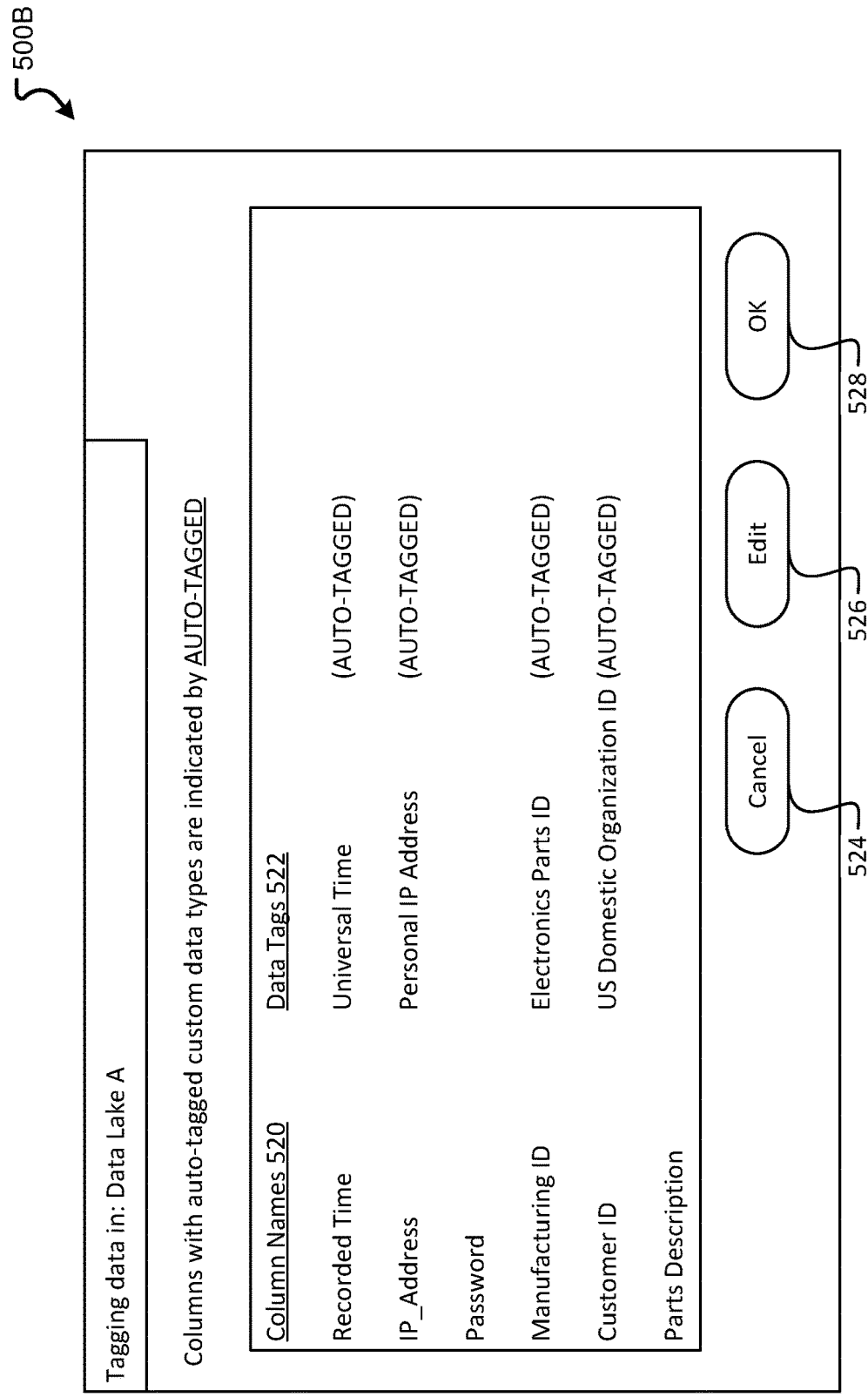
FIG. 5B illustrates an example of a screen indicating auto-tagging of data in accordance with aspects of the present disclosure.

FIG. 5B illustrates an example of a screen indicating auto-tagging of data in accordance with aspects of the present disclosure. A graphical user interface 500B indicates column names 520 of columns in a data lake A 122A and data tags 522 for respective columns. Columns that have been auto-tagged are indicated by "AUTO-TAGGED." A column name "Recorded Time" has a data tag "Universal Time" that has been auto-tagged based on the present disclosure, for example. A column with a column name "Password" is not tagged either automatically or manually. A column with a column name "Manufacturing ID" is tagged as "Electronic Parts ID" that has been auto-tagged. In aspects, the user may cancel and return to a previous screen by selecting a cancel 524 button. The user may edit the data tag by selecting an edit 526 button. The user may acknowledge and proceed to a next screen by selecting an OK 528 button.

Figure 6A:
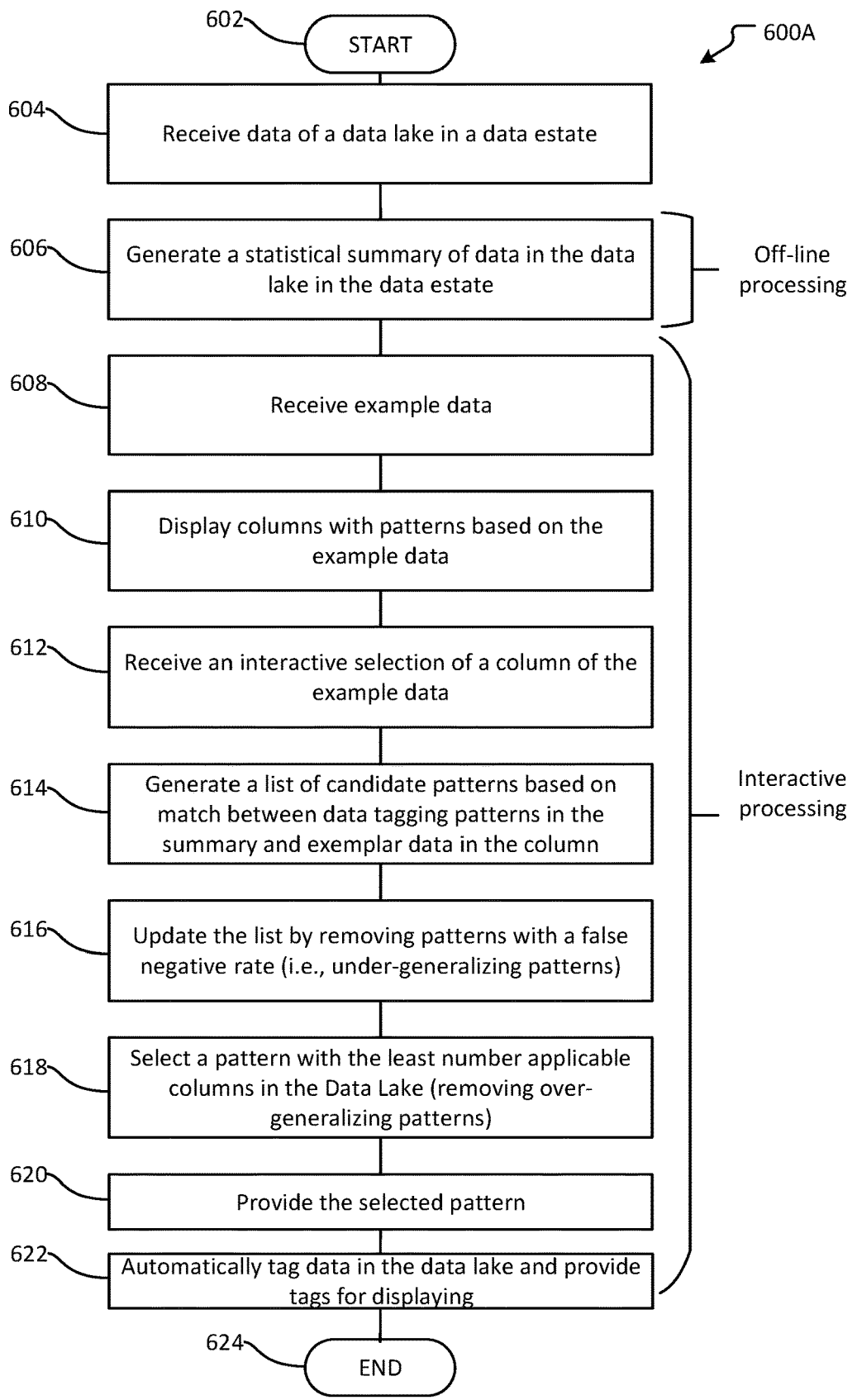
FIG. 6A illustrates an example of a method for auto-tagging data in a data lake in accordance with aspects of the present disclosure.

FIG. 6A an example of a method for auto-tagging data in a data lake in accordance with aspects of the present disclosure. A general order of the operations for the method 600A is shown in FIG. 6A. Generally, the method 600A begins with start operation 602 and ends with end operation 624. The method 600A may include more or fewer steps or may arrange the order of the steps differently than those shown in FIG. 6A. The method 600A can be executed as a set of computer-executable instructions executed by a computer system and encoded or stored on a computer readable medium. Further, the method 600A can be performed by gates or circuits associated with a processor, an ASIC, an FPGA, a SOC or other hardware device. Hereinafter, the method 600A shall be explained with reference to the systems, components, devices, modules, software, data structures, data characteristic representations, signaling diagrams, methods, etc., described in conjunction with FIGS. 1, 2, 3, 4, 5A, 5B, 6B, 7, and 8A-B.

Once started, method 600A begins with receive operation 604, which receives data of a data lake in a data estate. The user may specify a data lake and a data estate (or a target data storage or a database) or the data lake may be pre-defined for generating the statistical summary. Generate operation 606, which generates a statistical summary of data in a data lake in a data estate. In some embodiments, generating the statistical summary may take place as an offline processing on a predetermined or a periodic basis, where "offline" is meant to show that the work is done automatically and/or at a time prior to the selection of data-tagging patterns. The predetermining timing of generating the statistical summary may include when an amount of data surpassing a predefined threshold has been modified and at particular time of a day, for example. In some other aspects, generating the statistical summary may be performed using a lightweight processing that use a part of data in the data lake. The part of data may be randomly selected or based on predetermined columns and rows of the data lake. In other embodiments, the generation of the statistical summary is done online, e.g., on demand or with user interaction.

The statistical summary may include a list of data-tagging profiles and statistical information about coverages of respective data-tagging patterns in the data lake. In aspects, the list of data-tagging profiles may include all data-tagging patterns possible regardless of degrees of generalizations of data types.

Receive operation 608 receives example data from the user. In aspects, the example data may be in an example data file. The example data may or may not be a part of data in the data lake. In some aspects, a graphical user interface is provided to the user to receive a selection of a data file. A name of the specified exemplar data file may be displayed to user, as indicated in FIG. 5A, for example. The present disclosure scans content of the exemplar file and extracts column information.

Display operation 610 displays column information with an exemplar data-tagging pattern for each column of the received example data. In aspects a graphical user interface may be used to display the column information, as shown in FIG. 5A, for example. The display operation 610 may display a list of column names with sample data patterns in the regular expression (regex) form for respective columns.

Receive operation 612 receives an interactive input selection of a column of the exemplar data file. As shown in FIG. 5A, a graphical user interface may provide a list of columns in the exemplar data file for a selection. In aspects, the user may select a column by selecting and marking the column in the graphical user interface. In some aspects, a sample data type may be displayed. For instance, a user may select "Column Name: Manufacturer ID" as shown with the X in the box next to the option in FIG. 5A.

Generate operation 614 generates a list of candidate data-tagging patterns based on a match between data-tagging patterns in the statistical summary and the exemplar data in the selected column of the exemplar data file. In aspects, the generate operation 614 may include all data-tagging patterns that have at least one data that matches with respective data-tagging patterns. The list may include candidate data-tagging patterns that are under-generalizing, over-generalizing, or at the optimized level of generalization.

Update operation 616 updates the list of candidate data-tagging patterns through a series of filtering to remove data-tagging patterns that are under-generalizing data. In aspects, the update operation 616 removes one or more candidate data-tagging patterns, which have at least one false negative result in the data in the selected column in the exemplar data file. A matching result for a candidate data-tagging pattern is false negative when the candidate data-tagging pattern does not satisfy a value of data in the selected column. Upon removing all the candidate data-tagging patterns that are under-generalizing data, the list may contain one or more candidate data-tagging patterns that are either over-generalizing data or the best match (i.e., the most suitably generalizing data.

In aspects, the present disclosure removes candidate data-tagging patterns that are under-generalizing without requiring receiving human input. An impurity of a candidate pattern p on a data column $D \in T$ is defined as:

$$Imp_D(p) = |\{v|v \in D, p \notin P(v)\}|/|\{v|v \in D\}|$$

The impurity of p on data columns $D \in T$, measured as the fraction of values in D not matching p, to infer whether p is an under-generalization. If the candidate data-tagging patterns p(C) is used to tag data in the same domain as C, then $Imp_D(p)$ directly corresponds to expected false negative rate (FNR), or recall-loss for data-tagging tasks. In aspects, the expected false-negative-rate (FNR) of using pattern p(C) to tag a data column D drawn from the same domain as C, denoted by $FNR_D(p)$, may be defined as:

$$FNR_D(p) = FN_D(p)/TP_D(p) + FN_D(p)$$

where $TP_D(p)$ and $FN_D(p)$ are the number of false-positive detection and true-negative detection of p on D, respectively. Since D is from the same domain as C, ensuring that $TP_D(p)$ and $FN_D(p) = |D|$, $FNR_D(p)$ can be rewritten as:

$$FNR_D(p) = |\{v|v \in D, p \notin P(v)\}|/|\{v|v \in D\}| = Imp_D(p)$$

The computation as detailed above allows estimating a value of $FNR_D(p)$ using $Imp_D(p)$.

In embodiments, the present disclosure estimates the false negative rate FNR of pattern p on a given a corpus T, a data lake A, for example, denoted by $FNR_T(p)$, as:

$$FNR_T(p) = avg_{D \in T, v \in D, p \in P(v)} FNR_D(p)$$

That is, the present disclosure may determine a false negative rate of a corpus, a data lake, for example, based an average of a false negative rate of matching columns of a data-tagging pattern across all or at least a part of all columns in the data lake.

Select operation 618 may select a data-tagging pattern from the candidate data-tagging patterns with the least number of columns in which the candidate data-tagging pattern has matching data. The present disclosure determines the selected candidate data-tagging pattern as the data-tagging pattern for automatically tagging data in the data lake. The select operation 618 selects a candidate data-tagging pattern that has the minimal degree of over-generalizing data and thus the most suitably generalizing data in the data lake. In aspects, the statistical summary of the data lake maintains a number of columns that a data-tagging pattern match with at least one data in respective columns in the data lake. More generalizing (or broader) a data-tagging pattern is, more columns the data-tagging pattern finds matching data. The select operation 618 may use content of the statistical summary of the data lake to compare the number of matching columns among the updated candidate data-tagging patterns.

In aspects, the present disclosure determines a data-tagging pattern with the least likelihood of choosing an "over-generalizing" pattern by selecting a data-tagging pattern with the least coverage in the data lake, for example.

Data-tagging pattern may be under-generalized when the data-tagging pattern has a false negative rate of greater than zero based on performing a pattern matching against data in the selected column. That is, the data-tagging pattern determiner 150 may keep data-tagging patterns with zero false negative rate of matching data in the data in the selected column. In aspects, a data-tagging pattern may be over-generalized when the data-tagging pattern is valid in an excessive number of columns in the data lake. The data-tagging pattern determiner 150 removes both the under-generalized data-tagging patterns and the over-generalized data-tagging patterns from the list of candidate data-tagging patterns. The data-tagging pattern determiner 150 keeps a data-tagging pattern with the least number of columns where the data-tagging pattern is applicable in the data lake. Accordingly, the remaining data-tagging pattern is neither under-generalizing nor over-generalizing data patterns. Data tag provider 152 may use the remaining data-tagging pattern for auto-tagging data in the data lake. In aspects, the data tag provider 152 may provide the remaining data tag pattern as a final data-tagging pattern to the operator for acknowledgment or confirmation.

Accordingly, the present disclosure enables determining the data-tagging pattern both efficiently and accurately. Generating the statistical summary through a light weight off-line scanning of the data lake and the minimal user interaction of receiving a selection of a column in an exemplar data file provides efficiency. The process of selecting the data-tagging pattern through multiple steps of removing under-generalizing patterns and removing over-generalizing patterns provides accuracy of the data-tagging pattern for auto-tagging. The removal of under-generalizing pattern is based on false negative rates of the exemplar data in the selected column. The removal of over-generalizing pattern involves selecting a pattern with the least number of columns that the pattern is applicable in the data lake.

Provide operation 620 provides the selected data-tagging pattern for auto-tagging data in the data lake. In aspects, the selected data-tagging pattern may be provided to the user through the graphical user interface for acknowledgement before starting the auto-tagging of data in the data lake.

Tag operation 622 automatically tag data in the data lake using the selected data. In aspects, the present disclosure performs auto-tagging data in the data lake as a background or offline operations. Results of auto-tagging may be provided to the user through user interface, as shown in FIG. 5B, for example.

As should be appreciated, operations 602-624 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6B:
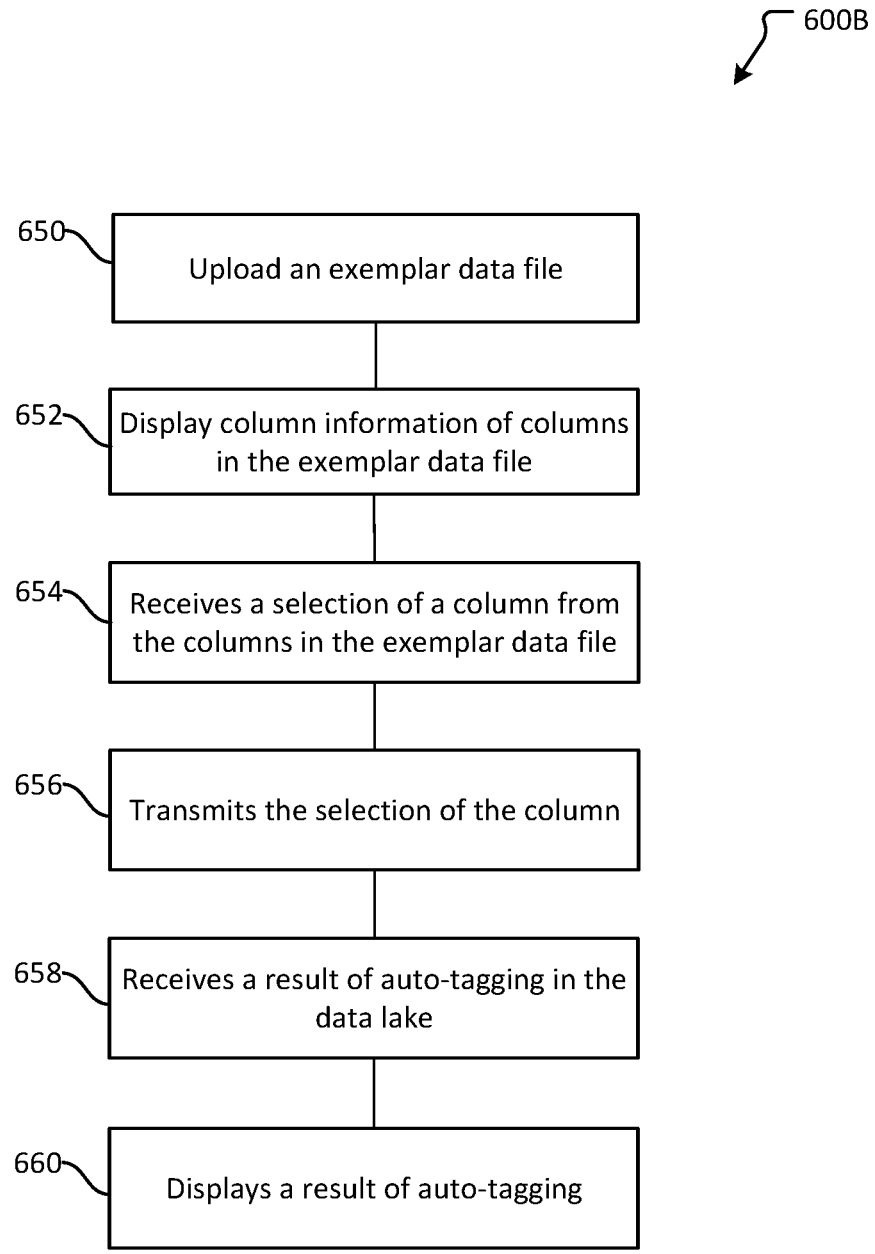
FIG. 6B illustrates an example of a method for interactively auto-tagging data in accordance with aspects of the present disclosure.

FIG. 6B illustrates an example method of interactively sharing content with other users through synchronizing folio across devices in accordance with aspects of the present disclosure. A general order of the operations for the method 600B is shown in FIG. 6B. Generally, the method 600B begins with upload operation 650 and ends after display operation 660. The method 600B may include more or fewer steps or may arrange the order of the steps differently than those shown in FIG. 6B. The method 600B can be executed as a set of computer-executable instructions executed by a computer system and encoded or stored on a computer readable medium. Further, the method 600B can be performed by gates or circuits associated with a processor, an ASIC, an FPGA, a SOC or other hardware device. Hereinafter, the method 600B shall be explained with reference to the systems, components, devices, modules, software, data structures, data characteristic representations, signaling diagrams, methods, etc., described in conjunction with FIGS. 1, 2, 3, 4, 5A-B, 6A, 7, and 8A-B.

Upload operation 650 uploads an exemplar data file from a client device. In aspects, the exemplar data file may contain a set of data in rows and in columns. The set of data may be "clean" data, without erroneous deviations in formats and data types in each column. There may be a graphical user interface for the user to select a file for upload.

Display 652 operation displays column information of the columns of data in the exemplar data file for a selection of one of columns by the user. Additionally or alternatively, the display 652 operation may display sample data patterns and data values for each of the columns as a part of column information. The sample data patterns may be determined using the data-tagging patterns in the statistical summary of the data lake and by selecting a data-tagging pattern that is neither under-generalizing nor over-generalizing.

Receive 654 operation interactively receives a selection of one of the columns from the user. The graphical user interface, as shown in FIG. 5A, for example, may indicate the selection of the column. The interactive input of the selection by the user determines a set of reference data for determining the data-tagging pattern for auto-tagging.

Transmit 656 operation transmits the selection of the column for determining a data-tagging pattern for auto-tagging data in the data lake. In aspects, the auto data tagger 140 may use data in the selected column to determine a data-tagging pattern for auto-tagging data in the data lake by removing data-tagging patterns that are under-generalizing based on false negative rates for the data in the selected column and by selecting a data-tagging pattern with the least number of matching columns in the data lake based on the statistical summary.

Receive 658 operation receives a result of auto-tagging in the data lake. In aspects, a graphical user interface, as in FIG. 5B, for example, may indicate a list of columns in the data lake, data tags in the data lake, and indications of one or more columns that have been auto-tagged by the auto data tagger 140.

As should be appreciated, operations 650-660 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
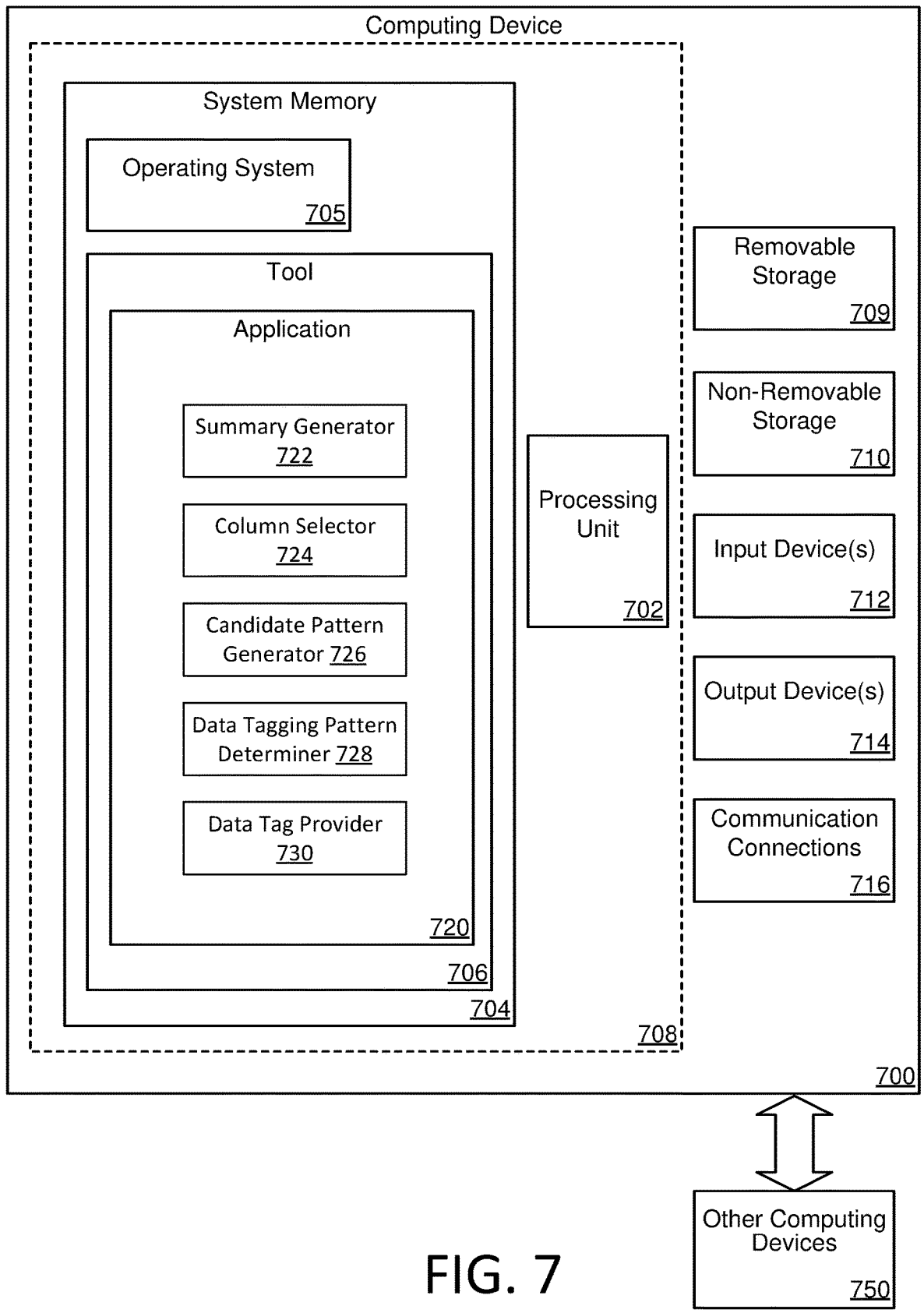
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes a summary generator 722, a column selector 724, a candidate pattern generator 726, a data-tagging pattern determiner 728, and a data tag provider 730, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
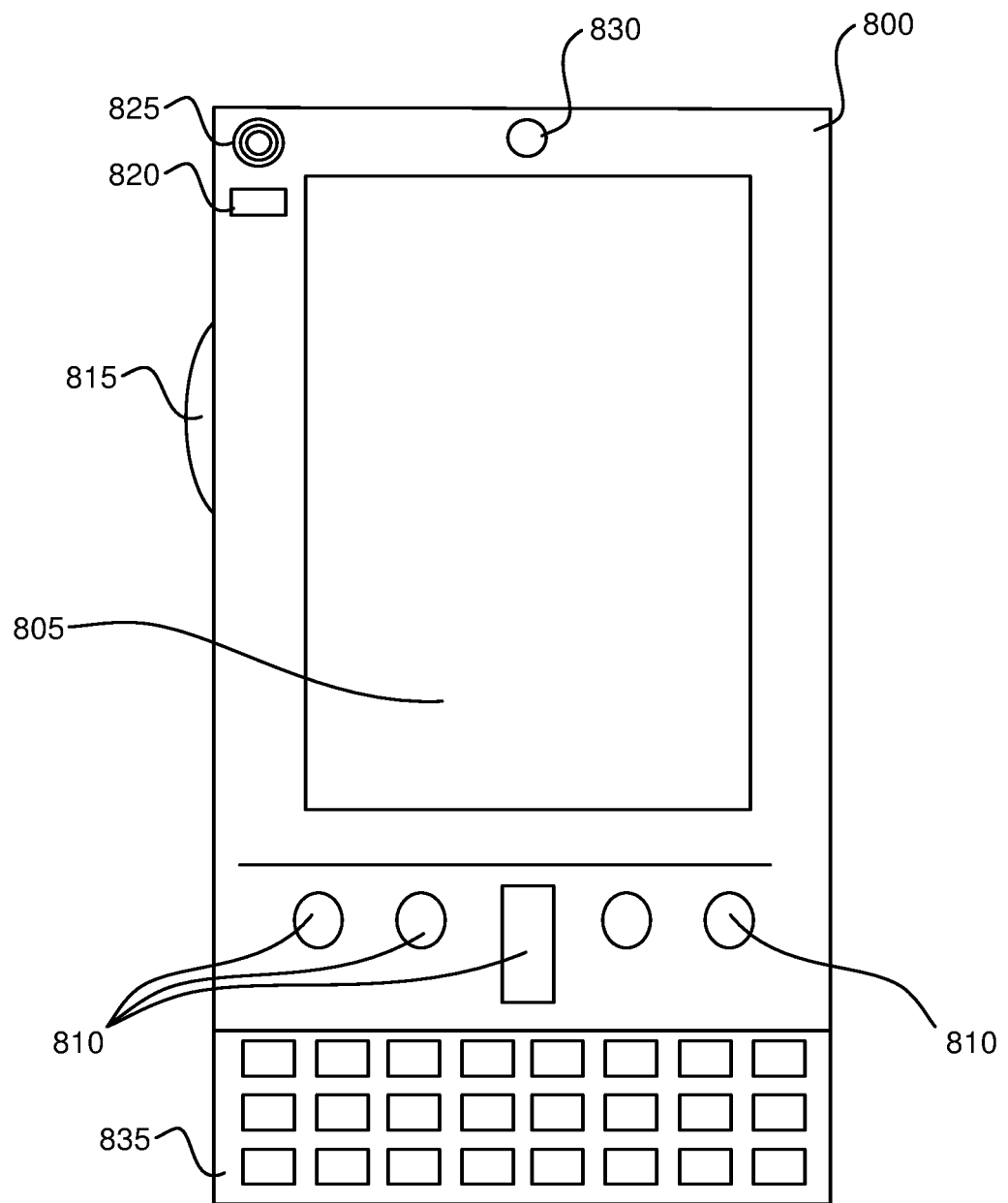
FIG. 8A is a simplified diagram of a mobile computing device with which aspects of the present disclosure may be practiced.
Figure 8B:
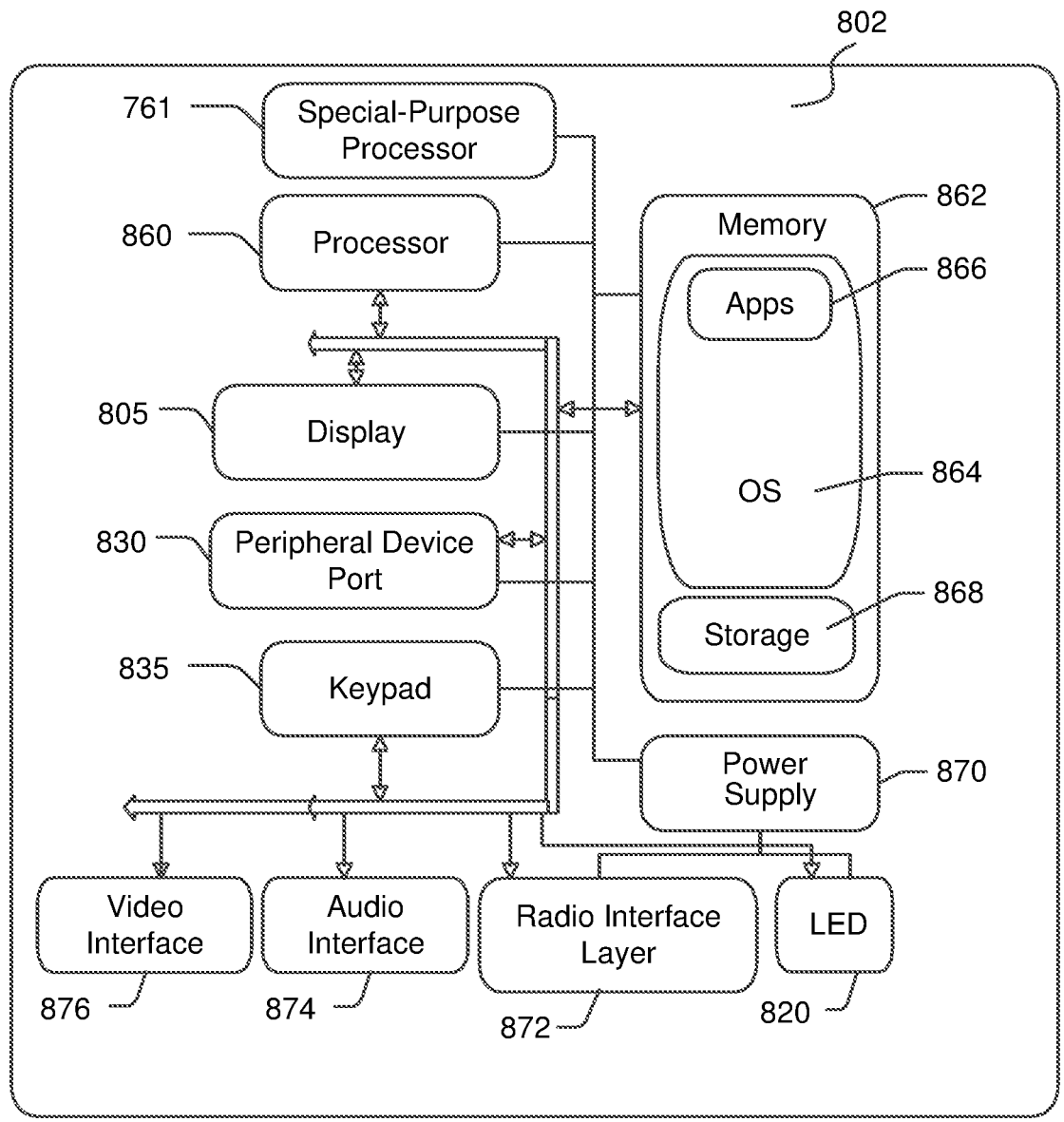
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., user of client device A 102A and user of client device B 102B in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., an application server 110 and an auto data tagger 140 in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

As will be understood from the foregoing disclosure, one aspect of the technology relates to a computer-implemented method for automatically tagging data. The method comprises receiving a first set of data; automatically generating, based at least on a part of the first set of data, a statistical summary of the first set of data, wherein the statistical summary includes: a plurality of data-tagging patterns for values of the part of the first set of data, and a degree of generalizing data patterns for each of the plurality of data-tagging patterns based on the part of the first set of data; interactively receiving a second set of data with a selection of a subset of the second set of data; generating, based on the plurality of data-tagging patterns in the statistical summary and data in the selected subset of the second set of data, a set of candidate data-tagging patterns, wherein the set of candidate data-tagging patterns includes a candidate data-tagging pattern that matches one or more data in the subset of the second set of data; selecting, based on the set of candidate data-tagging patterns, a data-tagging pattern; automatically tagging, based on the selected data-tagging pattern, one or more subsets of the first set of data; and providing the automatically tagged one or more subsets of the first set of data. The method further comprises: updating, by removing one or more under-generalizing candidate data-tagging patterns, the plurality of data-tagging patterns, wherein the one or more under-generalizing candidate data-tagging patterns include at least one false negative match of data in the selected column of the second set of data; and selecting, from the updated plurality of data-tagging patterns, the data-tagging pattern, wherein the data-tagging pattern includes a least number of columns where the data-tagging pattern is applicable at least in the part of the first set of data. The second set of data represents an exemplar data file. The subset of the second set of data represents a column in the exemplar data file. The first set of data represents at least a data lake, and the part of the first set of data represents data in one or more rows across a plurality of columns in the data lake. The method further comprises: generating a false negative rate of each candidate data-tagging patterns for matching data in the subset of the second set of data; updating the set of candidate data-tagging patterns by removing one or more candidate data-tagging patterns with non-zero false negative rates; and determining, based on the updated set of candidate data-tagging patterns, the data-tagging pattern, wherein the data-tagging pattern includes the least degree of generalizing data for each of the plurality of data-tagging patterns in the statistical summary. The degree of generalizing data relates to a false negative rate of each data-tagging pattern matching data in the selected subset of the second set of data, and wherein the statistical summary further includes one or more data-tagging signatures, the one or more data-tagging signatures including column names and column headers.

Another aspect of the technology relates to a system. The system comprises a processor; and a memory storing computer-executable instructions that when executed by the processor cause the system to: receive a first set of data; automatically generate, based at least on a part of the first set of data, a statistical summary of the first set of data, wherein the statistical summary includes: a plurality of data-tagging patterns for values of the part of the first set of data, and a degree of generalizing data patterns for each of the plurality of data-tagging patterns based on the part of the first set of data; interactively receive a second set of data with a selection of a subset of the second set of data; generate, based on the plurality of data-tagging patterns in the statistical summary and data in the selected subset of the second set of data, a set of candidate data-tagging patterns, wherein the set of candidate data-tagging patterns includes a candidate data-tagging pattern that matches one or more data in the subset of the second set of data; select, based on the set of candidate data-tagging patterns, a data-tagging pattern; automatically tag, based on the selected data-tagging pattern, one or more parts of the first set of data; and provide the automatically tagged one or more parts of the first set of data. The system comprises computer-executable instructions that when executed by the processor further cause the system to: update, by removing one or more under-generalizing candidate data-tagging patterns, the plurality of data-tagging patterns, wherein the one or more under-generalizing candidate data-tagging patterns include at least one false negative match of data in the selected column of the second set of data; and select, from the updated plurality of data-tagging patterns, the data-tagging pattern, wherein the data-tagging pattern includes a least number of columns where the data-tagging pattern is applicable at least in the part of the first set of data. The second set of data represents an exemplar data file, and wherein the subset of the second set of data represents a column in the exemplar data file. The first set of data represents at least a data lake, and wherein the part of the first set of data represents data in one or more rows across a plurality of columns in the data lake. The system comprises the computer-executable instructions that when executed by the processor further cause the system to: generate a false negative rate of each candidate data-tagging patterns for matching data in the subset of the second set of data; update the set of candidate data-tagging patterns by removing one or more candidate data-tagging patterns with non-zero false negative rates; and determine, based on the updated set of candidate data-tagging patterns, the data-tagging pattern, wherein the data-tagging pattern includes the least degree of generalizing data for each of the plurality of data-tagging patterns in the statistical summary. The degree of generalizing data relates to a false negative rate of each data-tagging pattern matching data in the selected subset of the second set of data, and wherein the statistical summary further includes one or more data-tagging signatures, the one or more data-tagging signatures including column names and column headers. The part of the first set of data includes columns of the data lake.

In still further aspects, the technology relates to a computer-readable recording medium storing computer-executable instructions that when executed by a processor cause a computer system to: receive a first set of data; automatically generate, based at least on a part of the first set of data, a statistical summary of the first set of data, wherein the statistical summary includes: a plurality of data-tagging patterns for values of the part of the first set of data, and a degree of generalizing data patterns for each of the plurality of data-tagging patterns based on the part of the first set of data; interactively receive a second set of data with a selection of a subset of the second set of data; generate, based on the plurality of data-tagging patterns in the statistical summary and the received data in the selected subset of the second set of data, a set of candidate data-tagging patterns, wherein the set of candidate data-tagging patterns includes a candidate data-tagging pattern that matches one or more data in the subset of the second set of data; select, based on the set of candidate tagging patterns, a data-tagging pattern; automatically tag, based on the selected data-tagging pattern, one or more parts of the first set of data; and provide the automatically tagged one or more parts of the first set of data. The computer-executable instructions when executed further causes the system to: update, by removing one or more under-generalizing candidate data-tagging patterns, the plurality of data-tagging patterns, wherein the one or more under-generalizing candidate data-tagging patterns include at least one false negative match of data in the selected column of the second set of data; and select, from the updated plurality of data-tagging patterns, the data-tagging pattern, wherein the data-tagging pattern includes a least number of columns where the data-tagging pattern is applicable at least in the first subset of the first set of data. The second set of data represents an exemplar data file, and wherein the subset of the second set of data represents a column in the exemplar data file. The first set of data represents at least a data lake, and wherein the first subset of the first set of data represents data in one or more rows across a plurality of columns in the data lake. The computer-executable instructions that when executed by the processor further cause the system to: generate a false negative rate of each candidate data-tagging patterns for matching data in the subset of the second set of data; update the set of candidate tagging patterns by removing one or more candidate data-tagging patterns with non-zero false negative rates; and determine, based on the updated set of candidate tagging patterns, the data-tagging pattern, wherein the data-tagging pattern includes the least degree of generalizing data for each of the plurality of data-tagging patterns in the statistical summary. The degree of generalizing data relates to a false negative rate of each data-tagging pattern matching data in the selected subset of the second set of data, and wherein the statistical summary further includes one or more data-tagging signatures, the one or more data-tagging signatures including column names and column headers, and wherein the subsets of the first set of data includes columns of the data lake.

Any of the one or more above aspects in combination with any other of the one or more aspect. Any of the one or more aspects as described herein.

What is claimed is:

1. A computer-implemented method for automatically tagging data, the method comprising:
   receiving a first set of data;
   automatically generating, based at least on a part of the first set of data, a statistical summary of the first set of data, wherein the statistical summary includes:
   a plurality of data-tagging patterns for values of the part of the first set of data, and
   a degree of generalizing data patterns for each of the plurality of data-tagging patterns based on the part of the first set of data;
   interactively receiving a second set of data with a selection of a subset of the second set of data, wherein the second set of data is distinct from the first set of data;
   generating, based on the plurality of data-tagging patterns in the statistical summary and data in the selected subset of the second set of data, a set of candidate data-tagging patterns, wherein the set of candidate data-tagging patterns includes a candidate data-tagging pattern that matches one or more data in the subset of the second set of data;
   selecting, based on a combination of a false negative rate associated with the candidate data-tagging pattern upon the one or more data in the subset of the second set of data and a degree of generalizing data pattern associated with the candidate data-tagging pattern upon the first set of data, the candidate data-tagging pattern as a data-tagging pattern;
   automatically tagging, based on the selected data-tagging pattern, one or more subsets of the first set of data; and
   providing the automatically tagged one or more subsets of the first set of data.

2. The computer-implemented method of claim 1, the method further comprising:
   updating, by removing one or more under-generalizing candidate data-tagging patterns, the plurality of data-tagging patterns, wherein the one or more under-generalizing candidate data-tagging patterns include at least one false negative match of data in the selected column of the second set of data; and
   selecting, from the updated plurality of data-tagging patterns, the data-tagging pattern, wherein the data-tagging pattern includes a least number of columns where the data-tagging pattern is applicable at least in the part of the first set of data.

3. The computer-implemented method of claim 1, wherein the second set of data represents an exemplar data file, and wherein the subset of the second set of data represents a column in the exemplar data file.

4. The computer-implemented method of claim 1, wherein the first set of data represents at least a data lake, and wherein the part of the first set of data represents data in one or more rows across a plurality of columns in the data lake.

5. The computer-implemented method of claim 1, the method further comprising:
   generating a false negative rate of each candidate data-tagging pattern for matching data in the subset of the second set of data;
   updating the set of candidate data-tagging patterns by removing one or more candidate data-tagging patterns with non-zero false negative rates; and
   determining, based on the updated set of candidate data-tagging patterns, the data-tagging pattern, wherein the data-tagging pattern includes the least degree of generalizing data for each of the plurality of data-tagging patterns in the statistical summary.

6. The computer-implemented method of claim 1, wherein the degree of generalizing data relates to a false negative rate of each data-tagging pattern matching data in the selected subset of the second set of data, and wherein the statistical summary further includes one or more data-tagging signatures, the one or more data-tagging signatures including column names and column headers.

7. The computer-implemented method of claim 1, wherein the part of the first set of data includes columns of the data lake.

8. A system for automatically tagging data, the system comprising:
   a processor; and
   a memory storing computer-executable instructions that when executed by the processor cause the system to:
   receive a first set of data;
   automatically generate, based at least on a part of the first set of data, a statistical summary of the first set of data, wherein the statistical summary includes:
   a plurality of data-tagging patterns for values of the part of the first set of data, and a degree of generalizing data patterns for each of the plurality of data-tagging patterns based on the part of the first set of data;

interactively receive a second set of data with a selection of a subset of the second set of data, wherein the second set of data is distinct from the first set of data;

generate, based on the plurality of data-tagging patterns in the statistical summary and data in the selected subset of the second set of data, a set of candidate data-tagging patterns, wherein the set of candidate data-tagging patterns includes a candidate data-tagging pattern that matches one or more data in the subset of the second set of data;

select, based on a combination of a false negative rate associated with the candidate data-tagging pattern upon the one or more data in the subset of the second set of data and a degree of generalizing data pattern associated with the candidate data-lagging pattern upon the first set of data, the candidate data-tagging pattern as a data-tagging pattern;

automatically tag, based on the selected data-tagging pattern, one or more parts of the first set of data; and provide the automatically tagged one or more parts of the first set of data.

9. The system of claim 8, the computer-executable instructions that when executed by the processor further cause the system to:

update, by removing one or more under-generalizing candidate data-tagging patterns, the plurality of data-tagging patterns, wherein the one or more under-generalizing candidate data-tagging patterns include at least one false negative match of data in the selected column of the second set of data; and select, from the updated plurality of data-tagging patterns, the data-tagging pattern, wherein the data-tagging pattern includes a least number of columns where the data-tagging pattern is applicable at least in the part of the first set of data.

10. The system of claim 8, wherein the second set of data represents an exemplar data file, and wherein the subset of the second set of data represents a column in the exemplar data file.

11. The system of claim 8, wherein the first set of data represents at least a data lake, and wherein the part of the first set of data represents data in one or more rows across a plurality of columns in the data lake.

12. The system of claim 8, the computer-executable instructions that when executed by the processor further cause the system to:

generate a false negative rate of each candidate data-tagging pattern for matching data in the subset of the second set of data;

update the set of candidate data-tagging patterns by removing one or more candidate data-tagging patterns with non-zero false negative rates; and determine, based on the updated set of candidate data-tagging patterns, the data-tagging pattern, wherein the data-tagging pattern includes the least degree of generalizing data for each of the plurality of data-tagging patterns in the statistical summary.

13. The system of claim 8, wherein the degree of generalizing data relates to a false negative rate of each data-tagging pattern matching data in the selected subset of the second set of data, and wherein the statistical summary further includes one or more data-tagging signatures, the one or more data-tagging signatures including column names and column headers.

14. The system of claim 8, wherein the part of the first set of data includes columns of the data lake.

15. A computer-readable storage medium for storing computer-executable instructions that when executed by a processor cause a computer system to:

receive a first set of data;

automatically generate, based at least on a part of the first set of data, a statistical summary of the first set of data, wherein the statistical summary includes:
a plurality of data-tagging patterns for values of the part of the first set of data, and
a degree of generalizing data patterns for each of the plurality of data-tagging patterns based on the part of the first set of data;

interactively receive a second set of data with a selection of a subset of the second set of data, wherein the second set of data is distinct from the first set of data;

generate, based on the plurality of data-tagging patterns in the statistical summary and the received data in the selected subset of the second set of data, a set of candidate data-tagging patterns, wherein the set of candidate data-tagging patterns includes a candidate data-tagging pattern that matches one or more data in the subset of the second set of data;

select, based on a combination of a false negative rate associated with the candidate tagging pattern upon the one or more data in the subset of the second set of data and a degree of generalizing data pattern associated with the candidate data-tagging pattern upon the first set of data, the candidate data-tagging pattern as a data-tagging pattern;

automatically tag, based on the selected data-tagging pattern, one or more parts of the first set of data; and provide the automatically tagged one or more parts of the first set of data.

16. The computer-readable storage medium of claim 15, the computer-executable instructions when executed further cause the system to:

update, by removing one or more under-generalizing candidate data-tagging patterns, the plurality of data-tagging patterns, wherein the one or more under-generalizing candidate data-tagging patterns include at least one false negative match of data in the selected column of the second set of data; and select, from the updated plurality of data-tagging patterns, the data-tagging pattern, wherein the data-tagging pattern includes a least number of columns where the data-tagging pattern is applicable at least in the first subset of the first set of data.

17. The computer-readable storage medium of claim 15, wherein the second set of data represents an exemplar data file, and wherein the subset of the second set of data represents a column in the exemplar data file.

18. The computer-readable storage medium of claim 15, wherein the first set of data represents at least a data lake, and wherein the first subset of the first set of data represents data in one or more rows across a plurality of columns in the data lake.

19. The computer-readable storage medium of claim 15, the computer-executable instructions that when executed by the processor further cause the system to:

generate a false negative rate of each candidate data-tagging pattern for matching data in the subset of the second set of data;

update the set of candidate tagging patterns by removing one or more candidate data-tagging patterns with non-zero false negative rates; and determine, based on the updated set of candidate tagging patterns, the data-tagging pattern, wherein the data-tagging pattern includes the least degree of generalizing data for each of the plurality of data-tagging patterns in the statistical summary.

20. The computer-readable storage medium of claim 15, wherein the degree of generalizing data relates to a false negative rate of each data-tagging pattern matching data in the selected subset of the second set of data, and wherein the statistical summary further includes one or more data-tagging signatures, the one or more data-tagging signatures including column names and column headers, and wherein the subsets of the first set of data include columns of the data lake.

* * * * *